(12) United States Patent
Leva et al.

(10) Patent No.: US 7,545,869 B2
(45) Date of Patent: Jun. 9, 2009

(54) METHOD OF REDUCING THE PEAK-TO-AVERAGE POWER RATIO OF A FOURIER TRANSFORM-GENERATED MULTI-CARRIER SIGNAL IN TRANSMISSION SYSTEMS

(75) Inventors: Angelo Leva, Uboldo (IT); Arnaldo Spalvieri, Milan (IT); Domenico Farnese, Cuggiono (IT); Giovanni Paltenghi, Villongo (IT)

(73) Assignee: Alcatel, Paris (FR)

( * ) Notice: Subject to any disclaimer, the term of this patent is extended or adjusted under 35 U.S.C. 154(b) by 432 days.

(21) Appl. No.: 09/962,145

(22) Filed: Sep. 26, 2001

(65) Prior Publication Data
US 2002/0061068 A1  May 23, 2002

(30) Foreign Application Priority Data
Oct. 4, 2000  (IT)  ............... MI2000A2143

(51) Int. Cl.
*H04K 1/10* (2006.01)
(52) U.S. Cl. .................................... 375/260
(58) Field of Classification Search .......... 375/260, 375/482, 222; 370/343, 342, 333
See application file for complete search history.

(56) References Cited

U.S. PATENT DOCUMENTS 5,835,536 A * 11/1998 May et al. ............ 375/260
6,512,797 B1 * 1/2003 Tellado et al. ......... 375/261
6,563,865 B1 * 5/2003 Usui ...................... 375/222
6,674,810 B1 * 1/2004 Cheng ................... 375/296
6,757,299 B1 * 6/2004 Verma ................... 370/482
2001/0022777 A1 * 9/2001 Bourget et al. ........ 370/210

FOREIGN PATENT DOCUMENTS

EP   0 725 510 A   8/1996

OTHER PUBLICATIONS

Jacky S. Chow, et al. "Mitigating Clipping Noise in Multi-carrier Systems", IEEE Proc. Int. Conf. Comm., Montreal Canada, pp. 715-719, Jun. 1997.
S.H. Muller, et al. "OFDM with Reduced Peak-to-Average Power Ratio by Multiple Signal Representation", Annals of Telecommunications vol. 52, No. 1-2, pp. 58-67, Feb. 1997.
S.H. Muller, et al. "A Novel Peak Power Reduction Scheme For OFDM", Proc. Int. Symp. On Pers., Ind. And Mob. Radio Comm. PIMRC 1997, Helsinki, Finland, pp. 1090-1094, Sep. 1997.

(Continued)

*Primary Examiner*—Chieh M Fan
*Assistant Examiner*—Jaison Joseph
(74) *Attorney, Agent, or Firm*—Sughrue Mion, PLLC (57) ABSTRACT

A method for reducing the peak-to-average power ratio (PAR) of a multicarrier signal in transmitter/receiver systems. The method comprises the steps of: providing, in transmission, a digital signal to be transmitted; and subjecting such a signal to be transmitted to a Fourier transform in order to obtain a modulated signal. It is characterized by the steps of generating an anti-peak signal; summing said anti-peak signal with said modulated signal; and transmitting the sum signal. The invention provides a transmitter and a receiver for implementing the method. Through the use of the invention, the PAR is reduced as compared with the known techniques.

18 Claims, 3 Drawing Sheets

OTHER PUBLICATIONS

J. Tellado, et al. "Peak Power Reduction for Multicarrier Transmission", Proc. IEEE Globecom, Commun. Theory Mini Conf. (CTMC) Sydney, Australia, Nov. 1998.

Heiko Schmidt, et al. "Reducing the Peak to Average Power Ration of Multicarrier Signals by Adaptive Subcarrier Selection", IEEE International Conference o Universal Personal Communications, ICUPC, Florence, Italy, Oct. 5, 1998.

Lampe, M. et al., "Reducing out-of-band emissions due to nonlinearities in OFDM systems", Vehicular Technology Conference, 1999 IEEE 49$^{TH}$ Houston, TX, USA, May 16-20, 1999, Piscataway, NY, USA, IEEE, US, vol. 3, May 16, 1999, pp. 2255-2259, XP010342247.

May, T. et al., "Reducing the peak-to-average power ratio in OFDM radio transmission systems", Vehicular Technology Conference, 1998, VTC 98, 48$^{TH}$ IEEE Ottawa, Ont. Canada, May 18-21, 1998, New York, NY, USA, IEEE, US, vol. 3, May 18, 1998, pp. 2474-2478, XP010288142.

* cited by examiner

| N | K | b | R (4-QAM/), R/N (%) | | R (16-QAM), R/N (%) | | R (64-QAM), R/N (%) | |
|---|---|---|---|---|---|---|---|---|
| 8 | 2 | 10 | 5 | 62 | 3 | 37 | 2 | 25 |
| 8 | 3 | 15 | 8 | 100 | 4 | | 3 | |
| 16 | 2 | 12 | 6 | 37 | 3 | | 2 | 12 |
| 16 | 3 | 18 | 9 | 56 | 5 | | 3 | 18 |
| 32 | 2 | 14 | 7 | 21 | 4 | 12 | 3 | 9 |
| 32 | 3 | 21 | 11 | | 6 | 18 | 4 | 12 |
| 32 | 4 | 28 | 14 | | 7 | | 5 | |
| 64 | 2 | 16 | 8 | | 4 | | 3 | |
| 64 | 3 | 24 | 12 | | 6 | | 4 | |
| 64 | 4 | 32 | 16 | | 8 | | 6 | |
| 128 | 2 | 18 | 9 | 7 | 5 | 4 | 3 | 2 |
| 128 | 3 | 27 | 14 | 10 | 7 | 5 | 5 | 4 |
| 128 | 4 | 36 | 18 | 14 | 9 | 7 | 6 | 4.6 |
| 256 | 2 | 20 | 10 | | 5 | | 4 | |
| 256 | 3 | 30 | 15 | | 8 | | 5 | |
| 256 | 4 | 40 | 20 | | 10 | | 7 | |
| 512 | 2 | 22 | 11 | 2 | 6 | 1 | 4 | 0.7 |
| 512 | 3 | 33 | 17 | 3 | 9 | 1.7 | 6 | 1 |
| 512 | 4 | 44 | 22 | 4 | 12 | 2 | 8 | 1.5 |

Fig. 5

METHOD OF REDUCING THE PEAK-TO-AVERAGE POWER RATIO OF A FOURIER TRANSFORM-GENERATED MULTI-CARRIER SIGNAL IN TRANSMISSION SYSTEMS

INCORPORATION BY REFERENCE OF PRIORITY DOCUMENT

This application is based on, and claims the benefit of, Italian Patent Application No. MI2000A002143 filed on Oct. 4, 2000, which is incorporated by reference herein.

BACKGROUND OF THE INVENTION

1. Field of the Invention

The present invention relates to the transmission field and in particular concerns the radio transmissions based upon multi-carrier modulation techniques. Still more in particular it is concerned with a new technique for reducing the peak-to-average power ratio in such radio transmission systems.

2. Description of the Prior Art

Recently, the multi-carrier modulation is becoming more and more attracting in the field of the modulation schemes thanks to its inherent robustness characteristics in frequency-selective channels with a high fading and in mobile radio channels. This and other reasons have made the multi-carrier modulation, in all its variants, the most appropriate one for systems such as DAB and DVB-T, ADSL, and wireless LAN, and for OFDMA access systems.

One of the problems affecting every multi-carrier systems, and which often discourages the use thereof, arises with the non-constant signal envelope through the time, and in particular with the possible amplitude peaks that could be much higher than the average values exhibited thereby; the signal is said to have a high Peak-to-Average Power Ratio (PAR). This hinders the use of high-efficiency amplification devices which exhibit deep nonlinearities, otherwise intermodulation products that distort the in-band signal and increase the out-of-band spectral content thereof will be generated, thus causing a greater interference with adjacent channels and degrading the error probability at reception side.

In order to reduce the effects of such a phenomenon, conventionally the simple reduction of power amplifier operating point has been performed, resulting in the consequent efficiency loss; this, when the transmitted power is maintained constant, results in an increase of power consumption and device cost. The increase in the out-of-band radiation is also present should signal predistortion techniques be employed, which techniques allow to compare the amplifier behavior with the one of an ideal clipper.

There are several techniques that are able to reduce PAR in OFDM transmitters; their efficiency and realization complexity vary a lot according to the circumstances. In general, the most effective techniques ([D1]: J. S. Chow, J. A. C. Bingham, M. S. Flowers, "Mitigating Clipping Noise in Multi-carrier Systems", *IEEE Proc. int. Conf. Comm.*, Montreal Canada, pages 715-719, June 1997; [D2]: S. H. Muller, R. W. Bauml, R. F. H. Fischer, J. B. Huber, "OFDM with Reduced Peak-to-Average Power Ratio by Multiple Signal representation", *Annals of Telecommunications*, Vol. 52, No. 1-2, pages 58-67, February 1997) involve a significant complexity increase, especially at the transmitter. Conversely, the simpler ones ([D3]: S. H. Muller, J. B. Huber, "A Novel Peak Power Reduction Scheme for OFDM", *Proc. Int. Symp. On Pers., Ind. and Mob. radio Comm. PIMRC '97*, Helsinki, Finland, pages 1090-1094, September 1997; [4]: J. Tellado, J. M. Cioffi, "Peak Power Reduction for Multi-carrier Modulation", *Proc. IEEE Globecom, Commun. Theory Mini Conf. (CTMC)*, Sydney, Australia, November 1998) have a limited effectiveness or result in a performance degradation that is not always deemed acceptable. Moreover, the implementability of each of them depends greatly on the specific application (type of channel, technology of the devices, presence of a return channel) as well as on the fundamental OFDM system parameters (number of carriers, Base Band or passband).

SUMMARY OF THE INVENTION

In view of the problems and the deficiencies of the known PAR reduction techniques, it is the main object of the present invention to provide a new technique for reducing the peak-to-average power ratio (PAR) which does not involve a significant increase in the complexity of the transmitter and/or the receiver, which is effective and which does not degrade the transmission performances.

These and other objects are achieved by a method according to claim 1, a transmitter according to claim 11 and a receiver according to claim 13. The corresponding dependent claims set forth further advantageous characteristics of the invention. All the claims are intended to be an integral part of the present description.

The basic idea of the present invention consists in measuring the PAR of the signal generated by the IFFT, in modifying the signal to be transmitted by a signal that is properly generated for such a purpose and in transmitting information on the occurred manipulation so that the receiver is able to restore the original signal.

The PAR reduction technique according to the present invention, called Pulse Superposition, combines a good efficiency with a relatively simple structure, without excessively compromising the transmitting bandwidth. Advantageously, it is applicable, by properly choosing the parameters, to any OFDM implementation.

There now follows a detailed description of the invention, given by way of a mere example and not of limitation, to be read with reference to the attached figures.

BEST MODE FOR CARRYING OUT THE INVENTION

Before describing in detail the invention it is deemed useful to give a short overview about the multi-carrier modulation, as well as a description of the PAR and its statistic characterization.

The underlying concept of multi-carrier modulations consists in subdividing the available spectrum into sub-channels, associating a carrier with each of them and distributing the information to be transmitted among the various sub-carriers or base functions. Each of them is then modulated separately. Finally, the set of these carriers, frequency-combined in a suitable manner, is transmitted. It is pointed out that the terms "carrier", "sub-carrier", "subchannel", "sub-band", "tone", "base function", will be employed in a transparent manner hereinafter where this does not give rise to any confusion.

The expression of the m-th baseband OFDM symbol is given by the sum of the contributions of each of the N sub-carriers:

$$s^m(t) = \text{Re}\{x^m(t)\} = \text{Re}\left\{\sum_{k=0}^{N-1} X_k^m e^{j2\pi \frac{kt}{T}} w(t)\right\}$$

where T is the duration of the whole symbol and w(t) is a rectangular window. Hence the modulation is obtained in digital form by performing the Inverse Fast Fourier Transform (IFFT), or a generic inverse Fourier transform, of the data block to be modulated, once these have been mapped into complex points of the constellation chosen for the modulation of the single carriers. At the receiving side, in order to recover the information, the inverse operation, i.e. the direct Fourier transform, is carried out. In fact, by sampling at $f_c = 1/T$:

$$x^m(n) = \sum_{k=0}^{N-1} X_k^m e^{j2\pi \frac{kn}{N}} w(n)$$

One of the disadvantages with the multi-carrier modulations that often discourages the use thereof, is the high fluctuation of the signal envelope. The possible power peaks, being considerably higher than the average power value, may exceed the dynamic characteristic of the power amplifier, thus causing the signal clipping.

The signal peak clipping has an effect on the received signal that is like an additive noise. If the number N of the carriers is high enough, the distribution of the signal amplitudes can be considered Gaussian whereby the PAR is infinite over the whole observation time and equal to about 10 dB over the 99.99% of the time. This means that if the operating point of the amplifier is set in such a way that this PAR value is not taken into account, the signal clipping event often occurs and the noise can be considered to be Gaussian in its in-phase and quadrature components.

But the main problem introduced by the signal clipping is related to the noise spectrum d(t): indeed, it exhibits components at frequencies out of the useful signal band, that is to say it determines a regrowth of the out-of-band overall spectrum (spectral regrowth or spectral spreading) and undesired in-band components because of the development of intermodulation products; these components are difficult to eliminate later on, since the analog filtering is expensive and disadvantageous in terms of Bit Error Rate (BER). On the other hand it is essential to maintain the Out-of-Band Radiation (OOBR) at a controlled level in order to limit the interference that is generated by the signal and by the signals that are frequency-adjacent thereto (Adjacent Channel Interference, ACI).

In order to limit the effects of such a phenomenon, conventionally one has to simply reduce the operating point of the power amplifiers, i.e. one has to increase the power Input Back-Off (IBO), which is defined as:

$$IBO = 10 \log_{10} \frac{P_{in,max}}{P_{in,m}}$$

where $P_{in,max}$ is the amplifier clipping power and $P_{in,m}$ is the mean input power of the signal, i.e. the amplifier operating point.

In this way, however, a loss of efficiency in the amplification is obtained; when the transmitted power is the same, this results in an increase in the consumption and cost of the devices. As mentioned above, for a given signal coming into the amplifier a parameter is defined which characterizes it for purposes of this description, the Peak-to-Average Power Ratio (PAR), namely the ratio of the peak power to the average power:

$$PAR \triangleq \frac{\max|s(t)|^2}{\frac{1}{T}\int_0^T (s(t))^2 dt}$$

Since all the implementations of the OFDM systems of interest are of digital nature, specific reference will be made from now on to the discrete versions of the quantities defined heretofore. Thanks to the introduction of a Cyclic Prefix (CP), namely a guard interval consisting in repeating, at the head and through the time, the signal trail, every OFDM symbol that is received does not feel the influence of the others; it is therefore possible to limit the description to a single symbol and to omit the index m from the expression of PAR.

It is also noted that the prefix CP, being the simple repetition of a portion of the signal, does not modify the PAR of the original symbol. The expression for a symbol that is over-sampled by a factor L becomes:

$$PAR = \frac{\max_n |x_{CP}^m(n/L)|^2}{E\{|x_{CP}^m(n/L)|^2\}} = \frac{\max_n |x^m(n/L)|^2}{E\{|x^m(n/L)|^2\}}$$

where $E\{\bullet\}$ indicates the time average over the period of a symbol and the fact that $E\{x^m(n)\}=0$ has been utilized.

Afterwards, by a simple manipulation, it is obtained that if all the carriers have the same constellation type, the PAR of the symbol m has an upper limit and therefore it is:

$$PAR \leq N \frac{\max_{X_k^m \in \{X\}} |X_k^m|^2}{E\{|X_k^m|^2\}}$$

that is verified, for instance, in the case of QAM constellations, when all the $\{X_k^m\}$ have the same phase and maximum amplitude at the same instant n.

In order to analyze the statistic features of an OFDM symbol envelope, it will be assumed that the sampling occurs at the Nyquist frequency (L=1).

Every sample of both the real and imaginary parts of the symbol is the linear combination of N independent variables, which are also identically distributed in the event that each sub-carrier has the same constellation. It follows that, for the central-limit theorem, if N is sufficiently large, the statistic of the real part of the samples is approximately described by a Gaussian distribution; analogous considerations apply to the imaginary component, so the complex signal $\text{Re}\{s(t)\} + j \cdot \text{Im}\{s(t)\}$ is the complex sum of two Gaussian random variables, thus the modules of every sample thereof is distributed according to a Rayleigh statistic:

$$f(x) = \frac{2x}{\sigma_x^2} e^{-\frac{x^2}{\sigma_x^2}} \qquad \frac{|\bar{x}|}{\sigma_x} = \sqrt{PAR_0}$$

where it has been made use of the fact that $\text{Re}\{x(n)\}$ has null average and therefore $$E\{|\text{Re}\{x(n)\}|^2\} = \sigma_x^2.$$

In the present case, one is interested in evaluating the probability that a symbol m will exhibit a peak whose modules $|x_n|$ exceeds a certain value $|\bar{x}|$ (or, analogously, the probability that the normalized power of a symbol sample will exceed the value $$PAR_0 = \frac{|\bar{x}|^2}{\sigma_x^2}),$$

since this can provide an indication of the frequency with which the saturation point of the amplifier is overcome, resulting in the already cited phenomena such as the generation of intermodulation products, the distortion of the in-band signal, and the increase in the out-of-band spectral content with a consequent higher interference with the adjacent channels. Thus, the Complementary Cumulative Distortion Function (CCDF, or cut-off probability) of the PAR of an OFDM signal is introduced:

$$CCDF(PAR_0) = P_{clip}(PAR_0) \triangleq Prob\left\{\max_k |x_k^m| > |\bar{x}|\right\}$$
$$= Prob\{PAR(x^m(n)) > PAR_0\}$$
$$k = 0, 1, \ldots N - 1.$$

Considering that the N samples are independent, through simple steps we get $$P_{clip}(PAR_0) = 1 - (1 - e^{PAR_0})^N$$

and such an assumption is well in agreement with experimental results.

The main known techniques for reducing PAR, briefly mentioned in the introductory part, are the Block Scaling (briefly "BS", see D1), Selective Mapping (briefly "SLM", see D2), Partial Transmit Sequences (briefly "PTS", see D3), Tone Reservation (briefly "TR"), Tone Injection (briefly "TI", see D4) and Adaptive Sub-carrier Selection (or briefly AsnS, [D5]: H. Schmidt, K. D. Kammeyer, "Reducing the peak to average power ratio of multi-carrier signals by adaptive sub-carrier selection", IEEE International Conference on Universal Personal Communications, ICUPC, Florence, Italy, Oct. 5, 1998).

The PAR reduction technique according to the present invention is based upon the idea of time summing the OFDM symbol with a signal c(n); n denotes the n-th signal sample which is optimized for overcoming the arising of high-power peaks. If the anti-peak signal is correctly constructed, the resulting signal $\bar{x}(n) = x(n) + c(n)$ has a more limited PAR. Naturally, reference is made to digital signals since all the techniques of this type operate before the conversion to analog.

Also the TR, TI, AsuS techniques are based upon the principle of summing an anti-peak signal, but they generate such a signal within the modulation operation itself: this limits the chances to optimize such a signal and consequently reduces the effectiveness thereof in overcoming the arising of high-power peaks.

Figure 1:
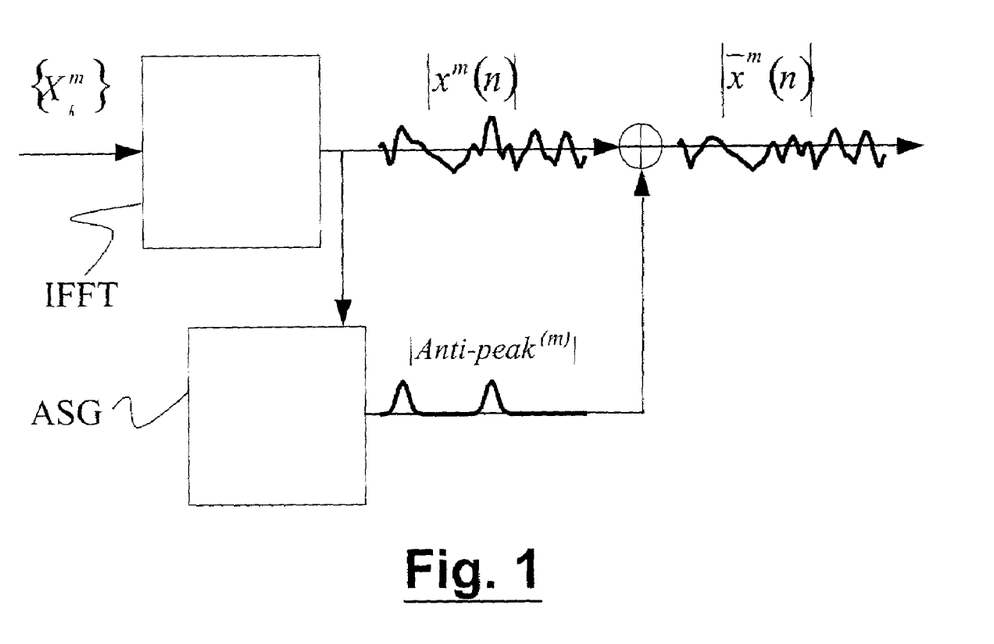
FIG. 1 shows a simplified diagram of a transmitter that utilizes the PAR reduction technique in accordance with the present invention.

The technique according to the present invention provides for superimposing an anti-peak signal c(n) to the already modulated signal (x(n)), by simply summing it at the output of the block following the IFFT operation, according to the general diagram shown in FIG. 1. In particular, it is possible to generate a signal composed of a time train of pulses that are summed in phase opposition with respect to the original signal should the latter exhibit the highest peaks; this is the reason why the present technique is termed Pulse Superposition. If the shape of the base pulse is defined and known to the receiver, it will suffice to transmit in the next symbol, as an auxiliary information for performing the demodulation, the position of such pulses inside the OFDM symbol and their sign. By fixing in advance also the number K of pulses generated for each symbol, the side information will be a fixed quantity and it is quantifiable in $K \cdot (\log N + 2)$ bits; the number R of subcarriers to be reserved for their transmission then depends on the cardinality M of the constellation; should K be equal to 2, considerable results are obtained. For this technique, the anti-peak signal generation algorithm is very simple and consists in the identification of the K peaks having the highest power inside the symbol and in the replica of a base pulse; in reception, once the auxiliary information is decoded, the subtraction of the reconstructed c(n) restores the original x(n) signal (of course with the exception of the possible distortions due to the channel and to the other blocks of the chain).

Of basic importance is the form of the elementary pulse $c_{base}(n)$ which, when replicated and positioned in a suitable manner, generates the anti-peak signal c(n). It, once summed with x(n) in correspondence of a peak, must indeed reduce the amplitude thereof without generating any secondary peaks, as illustrated in FIG. 1, and must lead to a spectrum of the anti-peak signal which does not have significant components out of the band of the original signal x(n), otherwise c(n) could be eliminated by filtering. Such requirements are satisfied if a Gaussian-type shape is chosen for $c_{base}(n)$ (see FIGS. 1 and 4), with a width at 3 dB comparable with the distance between the samples and an amplitude on the order of one half of the maximum amplitude. In order to obtain better results, the pulse position is decided according to the modulus of the signal but the corrections are applied separately on the in-phase and quadrature components of x(n), choosing the sign for each of them in such a way that it is in phase opposition on each of them.

The effectiveness of the PAR reduction method strictly depends on the number K of modifications that are carried out for each symbol; also K=2 allows the achievement of performances comparable, for instance, to the SLM method with U=4. The improvement obtained by increasing the value of K is distinct. As it is obvious, for smaller values of N, lower Ks will be enough.

Indeed, the amount of auxiliary information is not among the most limited ones because it is necessary to communicate the position and sign of the correcting pulse to the receiver; for each of them logN bits are required for the position and 2 bits for the sign of both the in-phase and quadrature portions, thus the total number of bits is b=K(log N+2). Once the cardinality M of the constellations of the subcarriers used for transporting the side information is established, also their number R is determined according to the equation R·log M≧K·(log N+2), hence $$R = \left\lceil \frac{K \cdot (\log N + 2)}{\log M} \right\rceil$$

Figure 5:
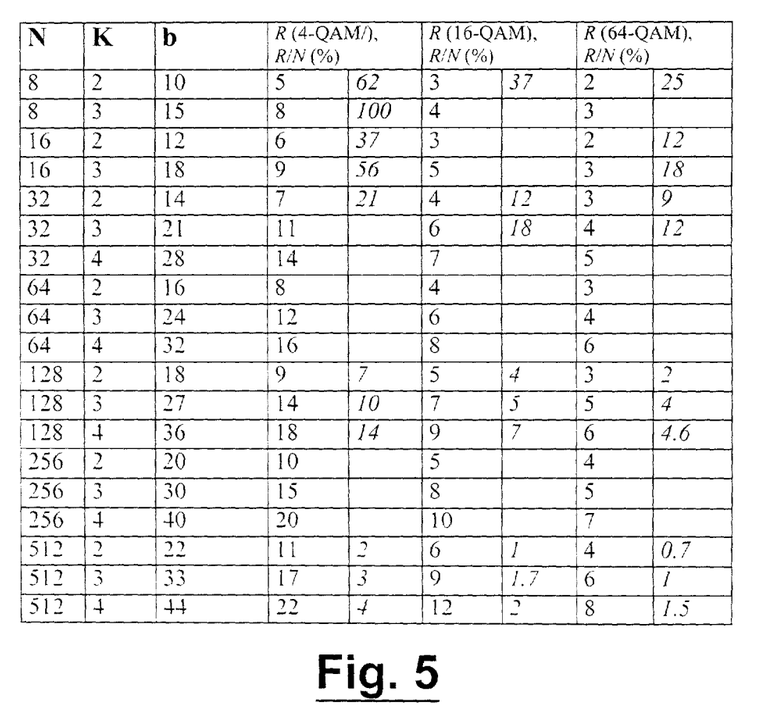
FIG. 5 represents a table showing the number b of auxiliary bits and the values of R (for some combinations of N and K) concerning information to be transmitted to the receiver.

The table of FIG. 5 shows the number b of auxiliary bits and the values of R for some combinations of N with K; it is seen how, while the same efficiency of the TR technique is obtained, the required values of R are anyway lower.

Assuming that the side-information is perfectly received, the receiver is able to perfectly restoring the original signal; as a result, the technique does not involve any penalty in terms of BER.

The additional complexity of the transmitter is very limited and mainly caused by the logic generating the anti-peak signal: indeed it is necessary calculating the modulus of x(n), identifying the largest K samples and correspondingly placing an elementary pulse that is in phase opposition with respect to the real and imaginary parts. Afterwards, the simple sum of the two components x(n) and c(n) is carried out. At the receiver, the signal c(n) must be subtracted from the received signal: the additional complexity is still lower because, in addition to the sum, only the step of generating an anti-peak signal, reconstructed on the basis of the received side-information, is required.

Figure 3:
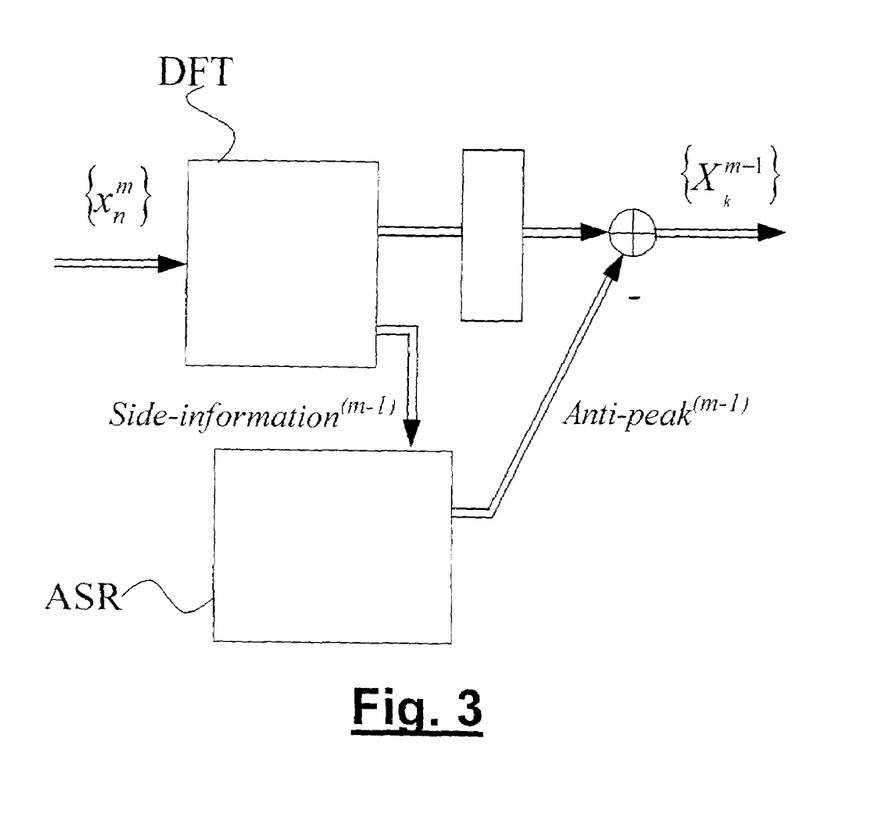
FIG. 3 shows a detailed diagram of a receiver that utilizes the PAR reduction technique in accordance with the present invention.

The more advantageous scheme for the receiver, shown in FIG. 3, provides for adding the side-information relating to the symbol m in the next symbol m+1; in this way, when the symbol m+1 reaches the receiver, the information on the anti-peak signal is immediately demodulated and used for restoring the symbol m which is already stored in the memory. A symbol latency is thus introduced, but one avoids summing in transmission the carriers carrying the side-information with the signal $\bar{x}(n)$, running the risk of increasing again the PAR thereof. The only necessary step consists in reserving for the side-information the carriers at the side of the spectrum that are unaffected by the anti-peak signal and ensuring a correct demodulation even before subtracting c(n).

With more specific reference to the various figures, FIG. 1 schematically shows the PAR reduction technique (transmission side) according to the present invention. The digital signal $\{X_k^m\}$ to be transmitted is introduced into a transform block IFFT where it is subjected to an inverse (fast) Fourier transform. The signal $|x^m(n)|$ at the output of the transform block IFFT is passed on for transmission but is also fed to a block (ASG) controlling and generating the anti-peak signal ($|\text{Anti-peak}^{(m)}|$). In other words, in the block ASG the signal $|x^m(n)|$ is controlled in order to ascertain if there is any peak and, according to such a control result, the anti-peak signal is generated. The anti-peak signal is summed in phase opposition with the signal coming out from block IFFT to obtain the signal ($|\bar{x}^m(n)|$) free of peaks and therefore with PAR less than the original signal. Naturally "m" designates the m-th symbol to be transmitted.

Figure 2:
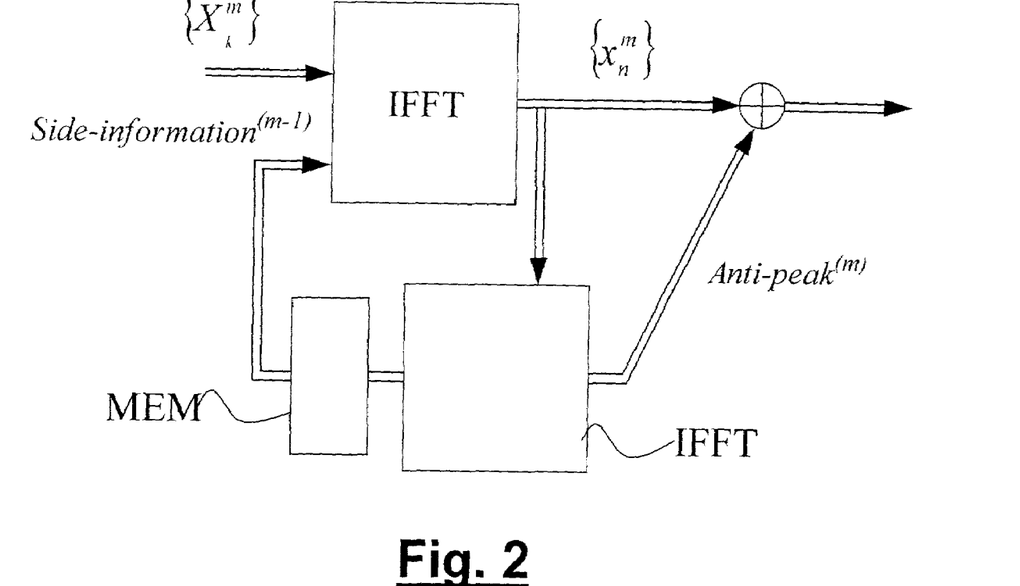
FIG. 2 shows a more detailed diagram of a transmitter that utilizes the PAR reduction technique in accordance with the present invention.

FIG. 2 differs from FIG. 1 in that the storage block MEM, that stores the signal outputting from block IFFT and related to the symbol m, has been represented. The block MEM is connected to an output of the block ASG and in turn is connected in a sort of feedback to block IFFT to which it provides auxiliary information (Side-information$^{(m+1)}$) related to the current symbol to be transmitted in the next symbol (m+1). If the shape of the base pulse is defined and known to the receiver, it is sufficient to transmit, as an auxiliary information for the demodulation in reception, the position of such pulses inside the OFDM symbol and their sign. By fixing in advance also the number K of pulses for each symbol, the side-information is a fixed quantity and is quantifiable in K·(log N+2) bits.

FIG. 3 shows what happens at the receiving side. The transmitted signal $$\{x_n^m\}$$

is received and is subjected to a Fourier transform in an appropriate block DFT. The signal outputting from such a block, related to the symbol m, is temporarily stored into a storage block MEM. The auxiliary information sent together with the signal is extracted from block DFT and is input to an anti-peak signal reconstruction block ASR. The auxiliary information concerning the preceding symbol (m−1) is then subtracted from the corresponding received signal, coming out from the storage block, to obtain the original signal related to the symbol m−1. The embodiment illustrated in FIG. 3 provides for subtracting the signal c(n) reconstructed directly in frequency in order to avoid a further FFT step. Naturally, this choice does not exclude the possibility of subtracting the signal c(n) reconstructed before carrying out the transform operation.

Figure 4:
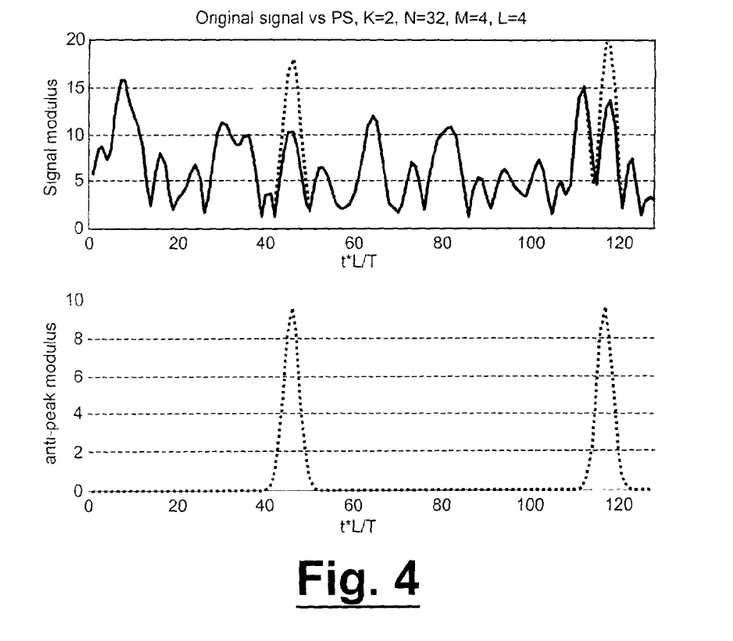
FIG. 4 shows a graph with the generation of the anti-peak signal for modifying the original signal to be transmitted, as shown in FIG. 2.

The first graph of FIG. 4 shows the modulus of the signal, as a function of time, to be corrected before its transmission with a suitable anti-peak signal. The peaks to be contrasted are the two exceeding the value of 15, under which there is shown the effect, in modulus, of the correction occurred in phase and on the real and imaginary parts (Pulse Superposition technique with number of carriers N=32 and number of pulses to be corrected K=2) by the proper anti peak signal shown in modulus in the graph at the bottom of FIG. 4.

The table of FIG. 5 shows, for each row, the number N of the carriers utilized (size of the IFFT), the number K of the peaks to be corrected through the time, the number b of bits to be transmitted as side-information in the next symbol and, for each type of constellation (4-QAM, 16-QAM, 64-QAM), respectively the number of carriers to be utilized for transmitting the side-information and their percentage with respect to the total number N of the carriers employed.

The present invention is applicable to all those transmission systems wherein the signal is generated by means of a Fourier transform operation (FFT, DFT, IFFT, IDFT, FT). The reduction of the signal PAR allows, having the same type of amplifier, for increasing the operating point, i.e. the transmitted power (in a transmitter network this allows for the reduction of the number of transmitters during network planning) or, having the same operating point, it allows for selecting an amplifier with a lower maximum (clipping) power. In both cases an unquestionable dual economic advantage is recognized. In particular, these advantages are felt in those networks where high-power transmitters are provided (like in the radio and television broadcasting) and anyway in complex networks where the employment of a high number of transmitters is contemplated.

From a series of simulations carried out, it results that the net gain obtained by the technique of the invention is about 3 dB over the peak-to-average power ratio of the original as compared with the original PAR.

There has thus been shown and described a novel peak-to-average power ratio reduction technique which fulfills all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. A method of reducing the peak-to-average power ratio of a multi-carrier signal in transmitter/receiver systems, the method comprising:

providing a digital signal to be transmitted;

subjecting the digital signal to be transmitted to a Fourier transform operation to obtain a modulated signal;

generating an anti-peak signal comprising a pulse train through time, a shape of a base pulse of said pulse train being defined and known at a receiver;

summing said anti-peak signal with said modulated signal in order to obtain a summed signal; and transmitting the summed signal and auxiliary information to enable demodulation of the summed signal as soon as the summed signal is received, wherein the step of summing said anti-peak signal with said modulated signal comprises summing said pulse train in phase opposition with respect to the original digital signal if the original signal exhibits peaks exceeding a certain value, and wherein the step of generating the anti-peak signal comprises generating a pulse train in which the base pulse has a Gaussian-type shape with a width at 3 dB comparable with a distance between samples of the original digital signal and an amplitude on an order of one half of a maximum amplitude of the original digital signal.

2. The method according to claim 1, wherein said step of generating said anti-peak signal comprises generating a signal composed of a base pulse train, the shape of the base pulse being defined and known at the receiver side, and wherein the step of transmitting said auxiliary information comprises transmitting information concerning the position of the base pulses inside the symbol and their sign.

3. The method according to claim 1, wherein said step of generating said anti-peak signal comprises generating a signal composed of a base pulse train, the shape of the base pulse being defined and known at a receiver side, the number of pulses generated for each symbol being also defined and known at the receive side, and wherein the step of transmitting auxiliary information comprises transmitting information in a fixed amount.

4. The method according to claim 1, wherein the step of generating the anti-peak signal further comprises establishing the pulse position as a function of a signal modulus and applying separately the correction on the in-phase and quadrature components of the original signal, choosing the sign for each of them so that it is in phase opposition over each of them.

5. The method according to claim 1, wherein the step of transmitting auxiliary information comprises transmitting said auxiliary information concerning a symbol together with the next symbol.

6. The method according to claim 1, further comprising:

receiving the summed signal;

extracting from said summed signal some the auxiliary information and reconstructing the anti-peak signal;

subjecting said summed signal to a Fourier transform thus obtaining a demodulated signal; and subtracting the anti-peak signal from said demodulated signal to obtain the original signal.

7. The method according to claim 6, wherein the step of subtracting the anti-peak signal from said demodulated signal comprises subtracting the auxiliary information concerning the preceding symbol with respect to the received one to obtain the original signal related to the preceding symbol.

8. A transmitter for transmitting a multi-carrier signal while reducing the peak-to-average power ratio, the transmitter comprising:

means for receiving a digital signal to be transmitted;

means for subjecting the digital signal to be transmitted to a Fourier transform operation to obtain a modulated signal;

means for generating an anti-peak signal comprising a pulse train through time, the shape of a base pulse of said pulse train being defined and known at a receiver;

means for summing said anti-peak signal with said modulated signal to generate a summed signal; and means for transmitting the summed signal and auxiliary information to enable demodulation of the transmitted signal as soon as the transmitted signal is received, wherein the means for summing said anti-peak signal with said modulated signal sum said pulse train in phase opposition with respect to the original digital signal if the original signal exhibits peaks exceeding a certain value, and wherein said means for generating said anti-peak signal comprise a pulse generator for generating a pulse train in which the base pulse has a Gaussian-type shape with a width at 3 dB comparable with a distance between samples of the original digital signal and an amplitude on an order of one half of a maximum amplitude of the original digital signal.

9. The transmitter according to claim 8, further comprising storage means for temporarily storing the signals outputting from the means performing the Fourier transform.

10. A method of reducing the peak-to-average power ratio of a multi-carrier signal in transmitter/receiver systems, the method comprising:

providing a digital signal to be transmitted;

subjecting the digital signal to be transmitted to a Fourier transform operation to obtain a modulated signal;

generating an anti-peak signal comprising a pulse train through time, a shape of a base pulse of said pulse train being defined and known at a receiver;

summing said anti-peak signal with said modulated signal in order to obtain a summed signal; and transmitting the summed signal and auxiliary information to enable demodulation of the summed signal as soon as the summed signal is received, wherein the step of generating the anti-peak signal comprises generating a pulse train comprising a number of base pulses, with each base pulse having a Gaussian-type shape, and wherein the step of generating the anti-peak signal further comprises establishing the pulse position as a function of a signal modulus and applying separately the correction on the in-phase and quadrature components of the original digital signal, choosing the sign for each of them so that it is in phase opposition over each of them.

11. The method according to claim 10, wherein the step of summing said anti-peak signal with said modulated signal comprises summing said pulse train in phase opposition with respect to the original signal if the original signal exhibits peaks exceeding a certain value.

12. The method according to claim 10, wherein said step of generating said anti-peak signal comprises generating a signal composed of a base pulse train, the shape of the base pulse being defined and known at the receiver side, and wherein the step of transmitting said auxiliary information comprises transmitting information concerning the position of the base pulses inside the symbol and their sign.

13. The method according to claim 10, wherein said step of generating said anti-peak signal comprises generating a signal composed of a base pulse train, the shape of the base pulse being defined and known at a receiver side, the number of pulses generated for each symbol being also defined and known at the receive side, and wherein the step of transmitting auxiliary information comprises transmitting information in a fixed amount.

14. The method according to claim 10, wherein the step of transmitting auxiliary information comprises transmitting said auxiliary information concerning a symbol together with the next symbol.

15. The method according to claim 10, further comprising:
receiving the summed signal;
extracting from said summed signal some the auxiliary information and reconstructing the anti-peak signal;
subjecting said summed signal to a Fourier transform thus obtaining a demodulated signal; and
subtracting the anti-peak signal from said demodulated signal to obtain the original signal.

16. The method according to claim 15, wherein the step of subtracting the anti-peak signal from said demodulated signal comprises subtracting the auxiliary information concerning the preceding symbol with respect to the received one to obtain the original signal related to the preceding symbol.

17. The method according to claim 10, wherein said Gaussian-type shape of said base pulse has a width at 3 db which is comparable with the distance between the samples and an amplitude on the order of one half of the maximum amplitude.

18. The method according to claim 10, wherein a number K of pulses generated for each signal is fixed in advance and wherein said auxiliary information is in a fixed number of bits equal to K (log N+2), wherein N is a number of subcarriers.

* * * * *